US 6,692,359 B1

(12) United States Patent
Williams et al.

(10) Patent No.: US 6,692,359 B1
(45) Date of Patent: Feb. 17, 2004

(54) METHOD OF INTERFACING ON A COMPUTER NETWORK BY VISUAL REPRESENTATIONS OF USERS, METHOD OF INTERACTING AND COMPUTER NETWORK

(75) Inventors: Kenneth A. Williams, Bass Lake, CA (US); David R. Slayback, Oakhurst, CA (US); Matthew D. George, Coarsegold, CA (US); Jeffrey A. Stephenson, Ahwahnee, CA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 08/149,026

(22) Filed: Nov. 8, 1993

Related U.S. Application Data

(63) Continuation of application No. 07/656,292, filed on Feb. 15, 1991, now abandoned.

(51) Int. Cl.[7] .............................................. A63F 13/00
(52) U.S. Cl. ....................... 463/42; 463/40; 463/29; 463/23; 345/758; 345/833; 709/204
(58) Field of Search ................... 395/200, 800, 395/500, 153, 154; 273/434, 439; 348/15; 463/40, 41, 42, 29, 23; 709/23, 200, 204, 223, 224, 227, 228; 345/733, 734, 735, 741, 751, 752, 753, 758, 700

(56) References Cited

U.S. PATENT DOCUMENTS

| | | | | |
|---|---|---|---|---|
| 3,701,971 A | * | 10/1972 | Sanner et al. ................. 395/153 |
| 3,753,234 A | * | 8/1973 | Gilbert et al. ............... 395/200 |
| 3,910,322 A | | 10/1975 | Hardesty, Jr. et al. ....... 395/575 |
| 4,045,789 A | | 8/1977 | Bristow ....................... 340/725 |
| 4,063,220 A | | 12/1977 | Metcalfe et al. .......... 340/825.5 |
| 4,126,851 A | | 11/1978 | Okor .......................... 273/85 G |
| 4,274,139 A | * | 6/1981 | Hodgkinson et al. ........ 395/200 |
| 4,414,621 A | * | 11/1983 | Bown et al. ................. 395/153 |
| 4,521,014 A | | 6/1985 | Sitrick ......................... 273/434 |
| 4,570,930 A | | 2/1986 | Matheson .................... 273/434 |
| 4,572,509 A | | 2/1986 | Sitrick ....................... 273/85 G |
| 4,752,069 A | | 6/1988 | Okada ......................... 273/434 |
| 4,856,787 A | * | 8/1989 | Itkis ............................ 273/237 |
| 4,974,173 A | * | 11/1990 | Stefik et al. ................. 395/153 |
| 4,987,492 A | * | 1/1991 | Stults et al. ................. 358/181 |
| 5,083,271 A | * | 1/1992 | Thacher et al. ............... 463/42 |
| 5,083,800 A | * | 1/1992 | Lockton ...................... 273/439 |
| 5,107,443 A | * | 4/1992 | Smith et al. ................. 395/158 |
| 5,111,409 A | * | 5/1992 | Gasper et al. ............... 395/152 |
| 5,119,319 A | * | 6/1992 | Tanenbaum ................. 395/153 |
| 5,195,086 A | * | 3/1993 | Baumgartner et al. ...... 370/264 |
| 5,347,632 A | * | 9/1994 | Filepp et al. ................ 395/200 |

FOREIGN PATENT DOCUMENTS

JP          6096059       *  5/1985  ................. 395/153

OTHER PUBLICATIONS

MACWORLD, Apr. 1990, pp. 167, 168, 170 and 172; review of software for 'America Online' and 'Prodigy 1.0'.*

(List continued on next page.)

Primary Examiner—Jessica Harrison
(74) Attorney, Agent, or Firm—Fish & Richardson P.C.

(57) ABSTRACT

A Methods of interfacing and interacting on a network having a central computer system and a plurality of telephone line-connected remote computer systems is provided, each remote computer system including a video display. The network methods include the means for and steps of creating a first visual representation of a first user on the visual display of the first computer system and a second visual representation of a second user on the visual display of the second computer system. The second visual representation is then displayed on the visual display of the first computer system and the first visual representation is displayed on the video display of the second computer system. The network and method allow an application program e.g. a video game in which a first player's selected visual representation, interest, skill levels and personal characteristics may be accessed by another player who is invited to play with the first to be employed by at least two primary users.

62 Claims, 3 Drawing Sheets

OTHER PUBLICATIONS

Conhaim, Wallys; "Apple Enters Videotex business with Consumer Service", Information Today, pp. 13, 16, 18, Jun. 1988.*

Risch R. "Knights on the Roundtable: Spotlight GEnie", Link–up, pp. 20, 21, 24, Dec. 1991.*

Webb, J., "Quantum Unveils Online System for PC Owners", Link–up pp. 1, 31,32 3, Feb. 1989.*

O'Leary, M. "GEnie Savors Vidotex Success", Link–up p. 15, Aug, 1988.*

"Linking up to Apple and Others", Classroom Computer Learning, p. 66, Sep. 1988.*

Description of Q–Link from [http://inconnu.isu.edu/~ink/new/links/computer/qlink].*

Morningstar et al., "The Lessons of Lucasfilm's Habitat", Cyberspace:First Steps, MIT Press, 1990.*

Description/QuantumLink User's Guide from [http://www.astralight.com/c64/qlink_ug.html].*

"Facemaker" Spinnaker software 1984, review of software by Phil Shapiro, from [http://nitros9.stg.net/facemaker.htm} accessed Apr. 3, 2002.*

Weyhrich, "Apple II History", Telecommunications from [http://apple2history.org/history/ah22.html] pp. 1–19, acessed Feb. 19, 2003.*

Evans, Al, "Remember Q–Link" from [http://www.qlinklives.org/Memories/Remember_Q–Link/remember_q–link.html} accessed Apr. 3, 2002.*

Farmer, "First use of AVATAR", from MUD_Dev mailing list, http://kanga.nu/archives/MUD–Dev–L/2002Q1/msg00011.php), accessed Apr. 3, 2002.*

Bowen et al., "How to get the most out of CompuServe 4th Edition", Bantam Books/Feb. 1989, pp. include 71–75, 365–390, 214, 188–248, 106–118, 94, 95, 207–209, 381, 409, 410.*

Glossbrenner, "Glossbrenner's Master Guide to GEnie", Osborne McGraw–Hill, 1991, pp. include 5, 9, 10, 42–44, 157–162 and 343–400.*

Lichy et al., "The Official America Online Membership Kit and Tour Guide PC Edition V 1.5", Ventana Press 1992, pp. include 70 74, 89–95, 169, 170, 233–256, 311–313, 329.*

'An Al Lowe Bio', 'Disk–o–graphy', and 'Leisure Suit Larry 4'from Al Lowe's Humor Site, [http://www/allowe.com}accessed Apr. 5, 2002.*

Stefik et al., WYSIWIS Revised: Early Experiences with Multiuser Interfaces, ACM Transaction on Office Information System, vol. 5, No. 2, Apr. 1987, pp. 147–167.*

Sarin et al., Computer–Based Real–Time Conferencing Systems, IEEE Computer, Oct. 1985, pp. 33–45.*

Foster, Gregg, Collaborative Systems and Multi–User Interfaces, Oct. 31, 1986.*

* cited by examiner

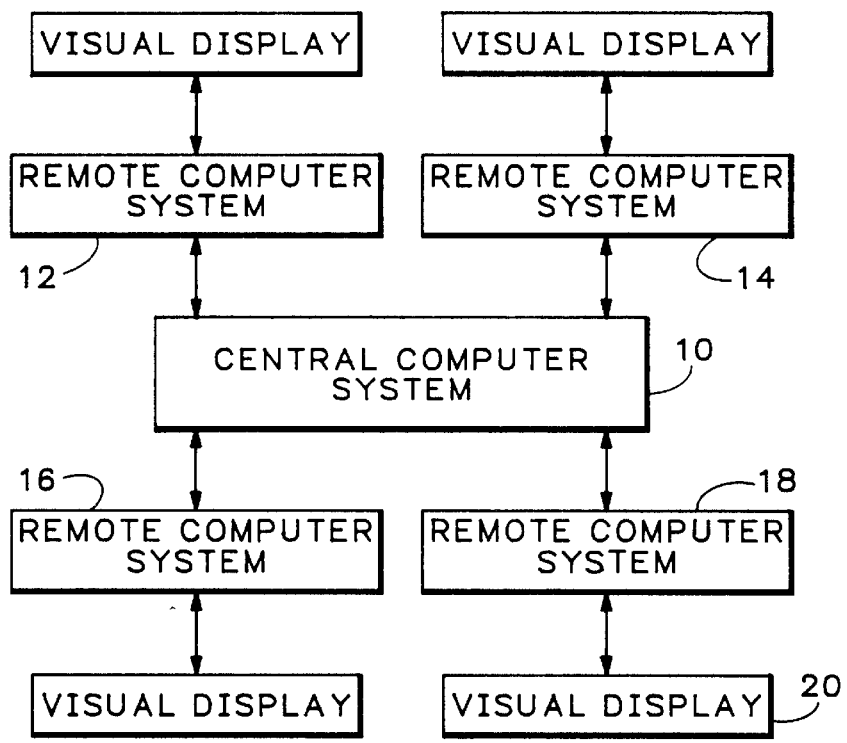
FIG. 1
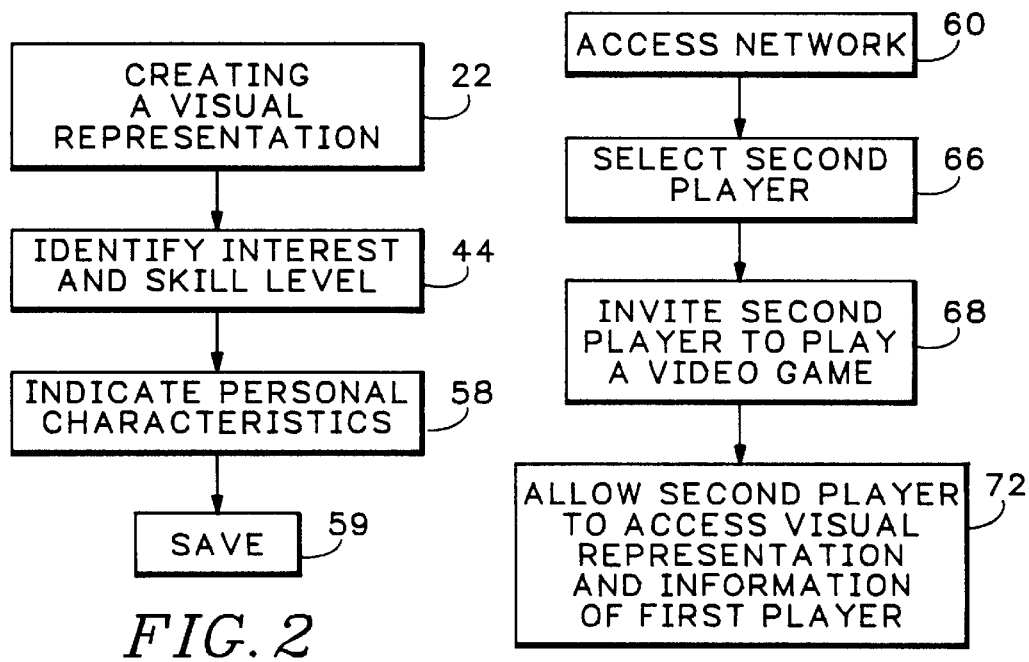
FIG. 2
FIG. 3

METHOD OF INTERFACING ON A COMPUTER NETWORK BY VISUAL REPRESENTATIONS OF USERS, METHOD OF INTERACTING AND COMPUTER NETWORK

This is a continuation of application Ser. No. 07/656,292 filed Feb. 15, 1991 now abandoned.

TECHNICAL FIELD

This invention relates to interfacing on a computer network and more particularly to the display of visual representations of users on video displays of a computer network.

BACKGROUND ART

A computer network is a plurality of computer systems interconnected by communication channels. For example, a central computer system may interconnect numerous remote computer systems. Each remote computer system can communicate with the other systems through the central computer system. Often, the communication channels are telephone lines. Thus, a computer operator at one location can access a computer operator at another location by both operators accessing a central computer system over telephone lines.

Computer networks are used for a variety of purposes, for example, to send messages from one point to another. They can also allow numerous people to access a database or a document. Additionally, networks can be used to play video games.

This invention provides a method of interfacing between computer systems on a network. Interfacing means simply to communicate between computer systems on the network. This invention also provides a method of interacting between different computer systems on a network and it provides an invented computer network.

DISCLOSURE OF THE INVENTION

The invented method of interfacing is used on a network having a central computer system and a plurality of remote computer systems. Each remote computer system includes a video display. The method includes the steps of creating a first visual representation of a first user on the visual display of the first computer system and a second visual representation of a second user on the visual display of the second computer system. The second visual representation is then displayed on the visual display of the first computer system and the first visual representation is displayed on the video display of the second computer system.

The invented method of interfacing can be expressed differently as creating a first visual representation of a first user on a first remote computer system, accessing the central computer from the first remote computer system, selecting at least one other user who has accessed the central computer system through a second remote computer system, and inviting the other user to employ an application, where the step of inviting allows the other user to view the first visual representation on the video display of the second remote computer system.

The invented method, applied to video games, includes the steps of creating a first visual representation of a first player on a first remote computer system, identifying an interest and a skill level of the first player for at least one video game, indicating predetermined personal characteristics of the first player, saving the visual representation, interest, skill levels and personal characteristics of the first player, accessing the central computer system from the first remote computer system over telephone lines, selecting a second player who has accessed the central computer system from a second remote computer system and inviting the second player to play a selected video game. The step of inviting allows the second player to access the visual representation, interest, skill levels and personal characteristics of the first player.

The invented method of interacting is used on a network having a central computer system and a plurality of remote computer systems. Each remote computer system is operated by a user and has access to at least one predetermined application program. The method includes the steps of employing one of the predetermined application programs by at least two primary users. The step of employing results in an action of the predetermined application program. A different user is then allowed to watch the action of the predetermined application program as it is employed by the primary users.

The invented computer network includes a central computer system, a plurality of remote computer systems connected to the central computer system over telephone lines, means for creating visual representations of users on the visual displays of the remote computer systems, means for sending the visual representation of a user from one remote computer system to a predetermined number of other remote computer systems, and means for running an application program between users of different remote computer systems.

BRIEF DESCRIPTION OF THE DRAWINGS

FIG. 1 is a block diagram of a computer network.

FIG. 2 is a flow chart outlining the selection steps of the invented method of interfacing.

FIG. 3 is a flow chart outlining the creation steps of the invented method of interfacing.

DETAILED DESCRIPTION AND BEST MODE FOR CARRYING OUT THE INVENTION

Figure 4:
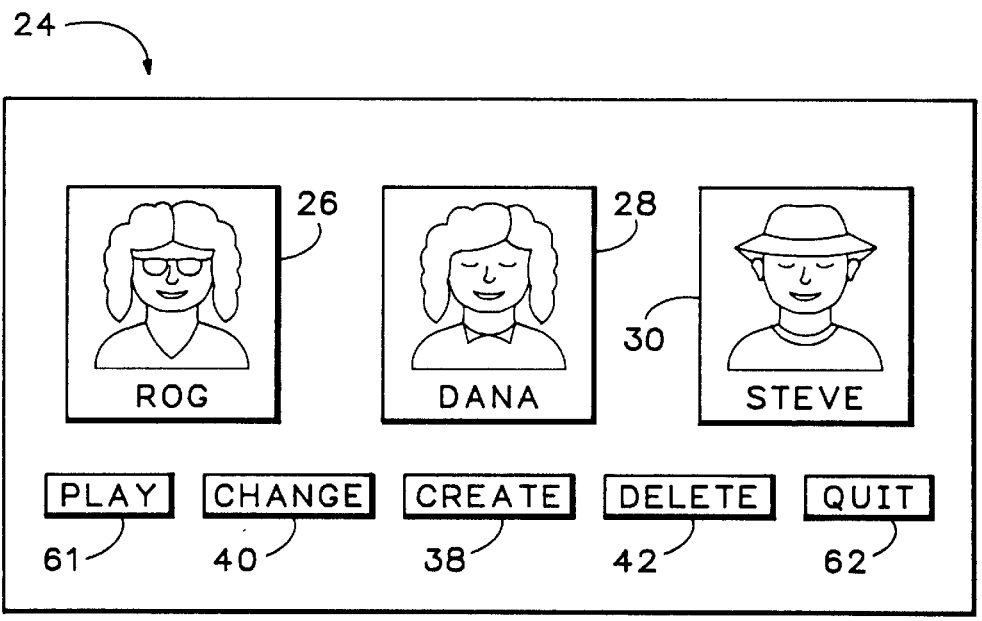
FIG. 4 shows a display containing the visages of several player that can be presented on the visual display of a computer system employing the invented methods.

FIG. 1 shows a computer network having a central computer system 10 interconnected with several remote computer systems 12, 14, 16 and 18. The computer network is often a wide-area network and the central computer system acts as a database server or smart switch that makes connections between the appropriate remote computer systems. Each remote computer system includes a visual, or video, display such as visual display 20 associated with remote computer system 18, and each remote computer system can communicate with one or more of the other remote computer systems through the central computer system. The remote computer systems and the central computer system can be interconnected with dedicated lines or, as is often the case, by switched or dial-up telephone lines. If the remote computer systems and the central computer system are interconnected by telephone lines, then each computer system would include a modem and each remote computer system would communicate through the central computer system over the modems as is known in the art. The central computer system may include any known method of recognizing the remote computer systems.

In a typical network, the remote computer systems will be MS-DOS-based personal computers with VGA monitors running at approximately 12 MHz or greater. The invention is however applicable to all types of computer systems including Apple MacIntosh computers and Amiga computers. The central computer system can be any type of system, including a PC/AT system running under extended DOS or UNIX at 25 MHz.

The invented method of interfacing between remote computer systems can be implemented on the network discussed above. In essence, the invented method interfaces by displaying graphical representations of the users of the computer network on the various visual displays of the remote computer systems. Thus, each user of a remote computer system can see a representation of the users of the other remote computer systems. The invented method of interfacing is applicable on a network with any given number of remote computer systems and any given number of users.

From another perspective, the invented method of interfacing creates a first visual representation, or visage of a first user on a first remote computer system. It then accesses the central computer system from the first remote computer system and selects at least one other user who has accessed the central computer system from a second remote computer system. The method then allows the first user to invite the other user to employ, i.e. use, an application, such as play a video game, where the step of inviting allows the other user to view the first visual representation on the video display of the second remote computer system. In most cases, the other user will have created a second visual representation of the other user on the second remote computer system and the first user can view the second visual representation on the video display of the first remote computer system.

The invented interfacing method is particularly applicable on networks designed for playing video games. Specifically, a first user at one location may play a video game with a second user at a second location on a network. Alternatively, several users at different locations may play a video game together. The invented method allows the different players to see representations of and to learn of the personal interests of the different players.

FIGS. 2–7 illustrate a preferred video game network embodying the invented method. Specifically, FIGS. 2 and 3 are flow charts outlining steps of the invented method and FIGS. 4–7 illustrate different displays that may be shown on a video display of a remote computer system while the invented method is employed.

In the preferred video game network, a user must create a visual representation of himself or herself before playing a game. That step is illustrated by block 22 in FIG. 2.

FIG. 4 shows at 24 a simplified screen display shown on the video display of a first remote computer system. It includes three visual representations 26, 28 and 30 of three different people. Each one of those three people may use the first remote computer system.

Figure 5:
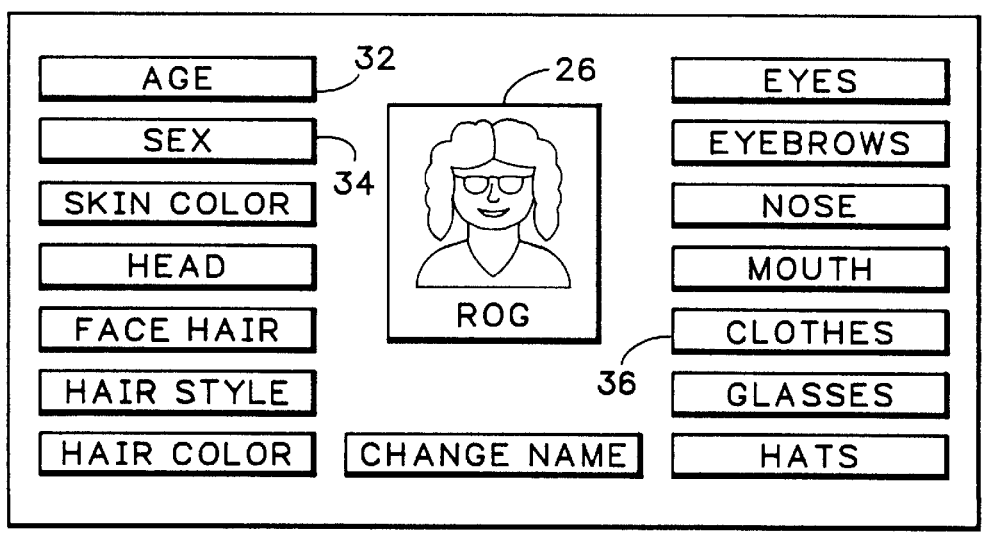
FIG. 5 shows a display allowing the creation and modification of a visage.

Each of the visual representations 26, 28 and 30 were created by software that allows a user to select predetermine appearance characteristics stored in memory accessible by the first remote computer system, and then combine the predetermined characteristics to create the visual representation. In FIG. 5, visual representation 26 is displayed surrounded by the names of different characteristics or attributes such as the names identified at 32, 34 and 36. Each of the named characteristics may include a library of different images. For example, characteristic 32 is "AGE". By accessing that characteristic, a user can view different faces having different ages. Similarly, a user can select different characteristics from those stored under each name. The selected characteristics can be combined in accordance with predetermined identity-building rules stored in memory to create a visual representation such as visual representation 26. Typically, the collection of different characteristics or attributes would be stored in an electronic memory device accessible by the first remote computer system. Each predetermined characteristic may comprise a pixel (picture element) pattern which can be displayed on a video display in a computer system as is known in the art. Additionally, the resulting visual representation can be named, just as visual representation 26 is name "ROG".

Each visual representation is a composite of different characteristics selected by a user. Thus, a visual representation can resemble a user or it can look completely different from a user, i.e. it may represent an assumed identity. That feature allows a user to decide what visual representation others see. Alternatively, a photograph of a user can be scanned and digitized and used as the visual representation. That process, however, requires more data to recreate the visual representation than combining different predetermined characteristics. Accordingly, the amount of data that can be transmitted over the network may dictate the way the visual representation is created.

Any method of displaying and combining predetermined characteristics can be used to create the visual representation. Block 38 in FIG. 4 represents software capable of creating the visual representations. When a user selects block 38, that software is accessed. Box 40 in FIG. 4 allows a user to edit or change a visual representation. Box 42 allows a user to delete a visual representation. The phrase "means for creating visual representations of users on visual displays of the remote computer system" may include software as described above.

After a user has created a visual representation, the user can then identify an interest level and a skill level in various video games. That step is illustrated at 44 in FIG. 2.

Figure 6:
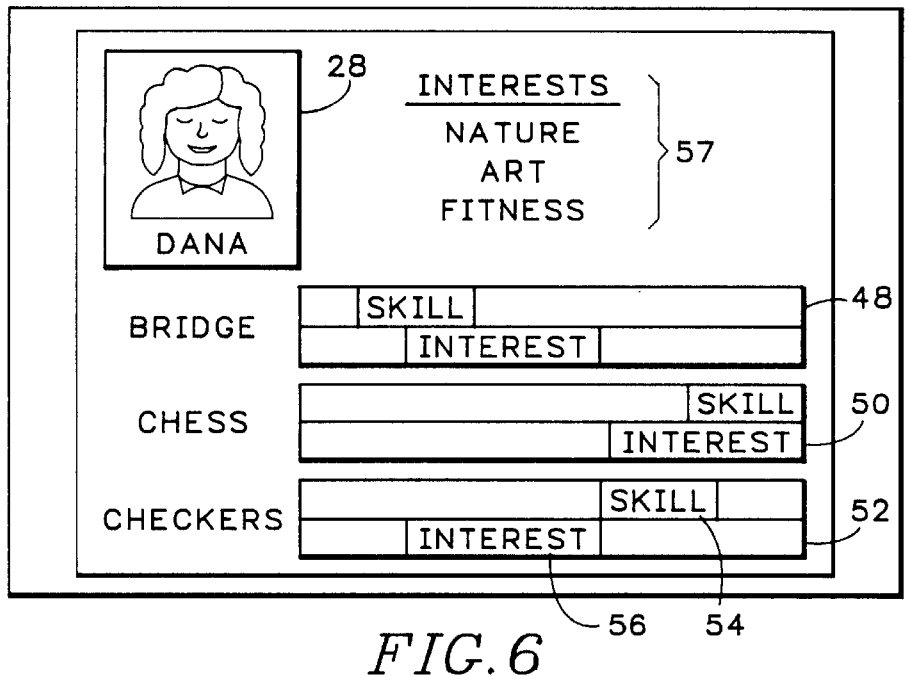
FIG. 6 shows a display showing a user's visage and other personal characteristics.

FIG. 6 illustrates a display on a video display of a remote computer system that includes visual representation 28. As explained, visual representation 28 shows a user of a remote computer system.

If the computer network is designed for playing video games, that person can then indicate his or her skill and interest levels in the different games available on the computer network. That is shown in FIG. 6 by bar graphs 48, 50 and 52. Bar 48 shows the skill and interest of the person depicted in visual representation 28 for the game bridge. Similarly, bar 50 is for the game chess and bar 52 is for the game checkers. The left end of the bars represents little skill or interest and the right end indicates great skill or interest. The positions between the ends indicate intermediate skill and interest levels. Markers, such as markers 54 and 56 can be positioned on the bar graphs to give an indication of the user skill and interest.

Various interests of the person identified by visual representation 28 can be shown at 57. In other words, a user of the invented method can list his or her interests and hobbies, such as shown at 57 in FIG. 6. In this way, a user can communicate personal information and characteristics to other users. This step is represented by step 58 in FIG. 2.

Thus, the invented method allows for a user of a computer network to identify himself or herself by a visual representation and by communicating personal characteristics. Obviously, other means of displaying personal characteristics and skill and interest levels can be used. Additionally, the order of steps 22, 44 and 58 in FIG. 2 can be changed.

After a user has created a visual representation and listed any interests, skill levels or characteristics, all the information is saved in memory accessible by the remote computer system, as represented by block 59 in FIG. 2. Alternatively, the information can be saved by the central computer system.

When a user wants to play a video game or run an application on the computer network, the user first accesses the network as shown at step 60 in FIG. 3. Again, the network can be accessed by any known means. The display shown in FIG. 4 shows a block 61 which the user may select to access the network. Similarly, block 62 may be selected to exit the network.

Figure 7:
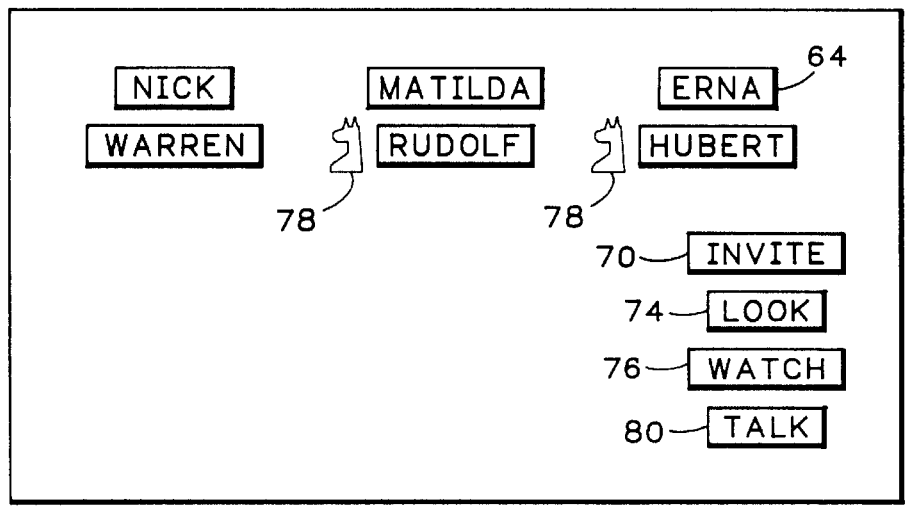
FIG. 7 shows a display containing attributes relevant to a computer network.

When the network is accessed, a display such as shown in FIG. 7 may be presented on the visual display of the first remote computer system. FIG. 7 includes a listing of different people who have also accessed the network, such as "ERNA" at 64. From this screen the user can select different functions.

To play a video game, the user must first select a second player as set forth in block 66 in FIG. 3. Then the user can invite the second player to play a video game as shown in block 68 in FIG. 3 and as represented by block 70 in FIG. 7. If the user invites a second player to play a game, the method outlined in FIG. 3 then allows the second player to access the visual representation and information of the first player, as shown at 72. In other words, the second player would see a screen displaying information about the first player similar to that shown in FIG. 6.

Another function that can be selected from the screen shown in FIG. 7 is to "LOOK" at information about others who have accessed the network, as represented by block 74 in FIG. 7. This function allows a first user to access information about any other user and to see a visual representation (whether realistic or not) of any other user.

Another function is to allow a user to interact as an observer or spectator, with other users by watching a video game or application as it is played between the other users. That feature is represented by block 76 in FIG. 7. For example, an icon such as icons 78 can be positioned next to the names of those who have accessed the computer network. The icons indicate whether a person is playing a game and if so, what type of game. In FIG. 7, icons 78 represent chess and show that "RUDOLPH" and "HUBERT" are playing chess. By selecting block 76, a user can watch "RUDOLPH" and "HUBERT" play chess.

Expressed differently, the invented method of interacting employs one of the predetermined application programs such as a video game by at least two primary users, such as "RUDOLPH" and "HUBERT" in FIG. 7. The method allows a different user to watch the action of the predetermined application program as it is employed by the primary users. This is accomplished by monitoring the action of the application as it is transmitted through the central computer system.

Another function allows one user of the computer network to send a message to any number of other users of the computer network, as represented by block 80 in FIG. 7. Other features, such as an electronic bulletin board, also can be included.

In most applications, each remote computer system on the computer network would have the software required to create the visual representations, to indicate personal characteristics, to communicate with the central computer system and to run different applications programs such as computer games. That software could all be resident on one or more floppy disks or on a hard disk. The phrase "means for sending the visual representation of a user from one remote computer system to a predetermined number of other remote computer systems through the central computer system" includes software capable of achieving that function, and the phrase "means for running one of the application programs between users of different remote computer systems" includes software capable of achieving that function. When each remote computer system has its own independent software, each remote computer system, in essence, plays its own video game and the central computer system simply transmits the moves or plays from other remote computer systems.

As explained, the invented method of interfacing and interacting allows for point-to-point communication between different remote computer systems. In other words, the invented methods and network allow for communication between any number of remote computer systems.

INDUSTRIAL APPLICABILITY

The invented method of interfacing is applicable to computer networks. It is specifically applicable when users desire to see visual representations of other users. The invented method of interacting is applicable for networks where two or more users together run an application program such as a video game, and where a different user desires to watch the action of the application. The invented network is applicable to the computer industry and specifically to the video game industry. While the preferred embodiment and best mode of the invention have been disclosed, variations and changes may be made without departing from the spirit of the invention.

We claim:

1. A computer-implemented method of interacting on a network having a central computer system and a plurality of remote computer systems, where each remote computer system has a video display and where a plurality of video games are accessible from the remote computer systems, the method comprising:

a first player creating a first visage representing a first player on a first remote computer system;

the first player identifying a level of interest of the first player for at least one of the video games, the level of interest being chosen from among gradations of interest including a level representing relatively little interest, a level representing relatively intermediate interest, and a level representing relatively great interest;

the first player indicating predetermined personal characteristics of the first player;

the first player saving the visage, interest level, and personal characteristics of the first player;

the first player accessing the central computer system from the first remote computer system;

a plurality of second players accessing the central computer system from a plurality of second remote computer systems while the first player accesses the central computer system;

showing a list of at least one second player on the video display of the first remote computer system;

the first player inviting a selected second player shown on the list to play a selected video game by transmitting an electromagnetic signal from the first remote computer system to the selected second remote computer system; and displaying on the video display of the selected second remote computer system at least a portion of the visage, the relative interest level, and the personal characteristics of the first player saved in the step of saving.

2. The method of claim 1 where the step of inviting allows the selected second player to display the visage, interest level, and personal characteristics of the first player, and further includes the step of enabling the selected second player to accept the invitation.

3. The method of claim 1 where the step of creating a first visage of a first player on a first remote computer system includes the steps of selecting predetermined characteristics stored in memory accessible by the first remote computer system, and combining the selected predetermined characteristics to create the first visage.

4. The method of claim 3 where the predetermined characteristics include different predetermined pixel patterns stored in memory to represent different ages, sexes, skin colors and hair colors.

5. The method of claim 1 where the step of indicating predetermined personal characteristics of the first player includes the step of identifying personal interests of the first player and displaying those interests on the video display of the first computer.

6. The method of claim 1 where the step of saving the visage, interest level, and personal characteristics of the first player records includes recording at least one of the visage, relative interest level, and personal characteristics in memory accessible by the first remote computer system.

7. The method of claim 1 where the selected second player has created a visage of the second player on the selected second remote computer system, has identified an interest level of the selected second player for at least one of the video games, has indicated predetermined personal characteristics of the selected second player, and has saved the visage, interest level, and personal characteristics of the selected second player, and where the step of inviting a second player who has accessed the central computer system from a selected second remote computer system includes the step of accessing the saved visage, interest level, and personal characteristics of the selected second player.

8. A computer-implemented method of interacting on a network
having a central computer system and a plurality of remote computer systems, where each remote computer system has a video display and where a plurality of video games are accessible from the remote computer systems, the method comprising:
a first player creating a first visage representing a first player on a first remote computer system;
the first player identifying an interest level and a skill level of the first player for at least one of the video games;
the first player indicating predetermined personal characteristics of the first player;
the first player saving the visage, interest level, skill level and personal characteristics of the first player;
the first player accessing the central computer system from the first remote computer system;
a plurality of second players accessing the central computer system from a plurality of second remote computer systems;
showing a list of at least one second player on the video display of the first remote computer system;
the first player inviting a selected second player on a selected second computer system from the list to play a selected video game by transmitting an electromagnetic signal from the first remote computer system to the selected second remote computer system; and
displaying on the video display of the selected second remote computer system at least a portion of the information saved in the step of saving,
where the step of identifying an interest and a skill level of the first player for at least one of the video games includes the step of displaying on the video display of the first computer system a bar graph indicating the interest level and the skill level of the first player for each video game, where the bar graph has two ends and one end represents a low interest and skill level, the other end represents a high interest and skill level and positions between the two ends represent intermediate interests and skill levels.

9. A computer implemented method of creating a player profile for interacting on a computer gaming network comprising the following:
enabling the first user to identify profile information with respect to each of one or more games, the profile information including level of interest, the level of interest being chosen from among gradations of interest including a level representing relatively little interest, a level representing relatively intermediate interest, and a level representing relatively great interest; and
enabling the first user to make the profile information accessible to a first remote computer system, a central computer system, and at least one other remote computer system,
wherein the first computer system, the central computer system, and at least one other remote computer system are elements of a computer gaming network used for multiplayer gaming.

10. The method of claim 9 wherein the profile information is automatically rendered upon the first user inviting a second user to play a game.

11. The method of claim 10 wherein enabling the first user to make the profile information accessible comprises displaying the rendered profile information to the second user upon the first user inviting the second user to play the game.

12. The method of claim 10 further comprising automatically rendering profile information of the second user and displaying the rendered profile information of the second userto the first user upon the first user inviting the second user to play the game, the profile information of the second user including a level of interest, the level of interest being chosen from among gradations of interest including a level respresenting relatively little interest, a level representing relatively intermediate interest, and a level representing relatively great interest.

13. The method of claim 9 wherein the profile information is automatically rendered upon the second user determining that the first user has accessed the central computer system and then the second user taking an action demonstrating an interest in the first user.

14. The method of claim 9 wherein enabling the first user to identify includes enabling the first user to identify both an interest level and a skill level with respect to each of one or more of a plurality of games.

15. The method of claim 9 wherein enabling the first user to identify includes enabling identification of an interest level with respect to each of one or more games.

16. The method of claim 9 wherein enabling the first user to identify includes enabling identification of a skill level with respect to each of one or more games.

17. The method of claim 9 further comprising enabling the first user to select a visage and enabling the first user to save the visage such that the visage is accessible to a first remote computer system, a central computer system, and at least one other remote computer system.

18. The method of claim 9 further comprising enabling the first user to identify personal characteristics and enabling the first user to save the personal characteristics such that the personal characteristics are accessible to a first remote computer system, a central computer system, and at least one other remote computer system.

19. The method of claim 18 wherein the enabling the first user to identify personal characteristics comprises enabling the first user to identify personal characteristics not related to computer games.

20. A computer implemented method of accessing a player profile for interacting on a computer gaming network comprising the following:

enabling the first user to access profile information of a second user with respect to each of one or more games, the profile information including a level of interest, the level of interest being chosen from among gradations of interest including a level representing relatively little interest, a level representing relatively intermediate interest, and a level representing relatively great interest; and enabling the first user to initiate a game with the second user based on the profile information, wherein the first user accesses the profile information using a first remote computer system that communicates with a computer gaming network for multiplayer gaming that includes a central computer system and at least one other remote computer system.

21. The method of claim 20 wherein the profile information is automatically rendered upon the first user inviting a second user to play a game.

22. The method of claim 21 wherein enabling the first user to access profile information of a second user comprises displaying the rendered profile information to the first user upon the first user inviting the second user to play the game.

23. The method of claim 21 further comprising automatically rendering profile information of the first user and displaying the rendered profile information of the first user to the second user upon the first user inviting the second user to play the game, the profile information including a relative interest level of the first user for the first identified video game relative to the second identified video game.

24. The method of claim 20 wherein the profile information is automatically rendered upon the second user determining that the first user has accessed the central computer system and then the second user taking an action demonstrating an interest in the first user.

25. The method of claim 20 wherein enabling the first user to access includes enabling the first user to access both an interest level and a skill level of the second user with respect to each of one or more of a plurality of games.

26. The method of claim 20 wherein enabling the first user to access includes enabling access of an interest level of the second user with respect to each of one or more games.

27. The method of claim 20 wherein enabling the first user to access includes enabling access of a skill level of the second user with respect to each of one or more games.

28. The method of claim 20 further comprising enabling the first user to access a visage of the second user.

29. The method of claim 20 further comprising enabling the first user to access personal characteristics of the second user.

30. The method of claim 29 wherein enabling the first user to access personal characteristics comprises enabling the first user to access personal characteristics of the second user not related to computer games.

31. A computer-implemented method of interacting on a network having a central computer system and a plurality of remote computer systems, where each remote computer system has a video display and where a plurality of video games are accessible from the remote computer systems, the method comprising:

a first player creating a first visage representing a first player on a first remote computer system;

the first player identifying a relative interest level of the first player for a first identified video game relative to a second identified video game, the first and second identified video games being selected from among the plurality of video games;

the first player indicating predetermined personal characteristics of the first player;

the first player saving the visage, relative interest level, and personal characteristics of the first player;

the first player accessing the central computer system from the first remote computer system;

a plurality of second players accessing the central computer system from a plurality of second remote computer systems while the first player accesses the central computer system;

showing a list of at least one second player on the video display of the first remote computer system;

the first player inviting a selected second player shown on the list to play a selected video game by transmitting an electromagnetic signal from the first remote computer system to the selected second remote computer system; and displaying on the video display of the selected second remote computer system at least a portion of the visage, the relative interest level, and the personal characteristics of the first player saved in the step of saving.

32. The method of claim 31 where the step of inviting allows the selected second player to display the visage, the relative interest level, and personal characteristics of the first player, and further includes the step of enabling the selected second player to accept the invitation.

33. The method of claim 31 where the step of creating a first visage of a first player on a first remote computer system includes the steps of selecting predetermined characteristics stored in memory accessible by the first remote computer system, and combining the selected predetermined characteristics to create the first visage.

34. The method of claim 33 where the predetermined characteristics include different predetermined pixel patterns stored in memory to represent different ages, sexes, skin colors and hair colors.

35. The method of claim 31 where the step of identifying a relative interest level of the first player for the first identified video game includes the step of displaying on the video display of the first computer system a bar graph indicating an interest level of the first player for the first identified video game and an interest level of the first player for the second identified video game, where each bar graph has two ends and one end represents a low interest level, the other end represents a high interest level and positions between the two ends represent intermediate interests levels.

36. The method of claim 31 where the step of indicating predetermined personal characteristics of the first player includes the step of identifying personal interests of the first player and displaying those interests on the video display of the first computer.

37. The method of claim 31 where the step of saving the visage, relative interest level, and personal characteristics of the first player, includes recording at least one of the visage, relative interest level, and personal characteristics in memory accessible by the first remote computer system.

38. The method of claim 31 where the selected second player has created a visage of the second player on the selected second remote computer system, has identified a relative interest level of the selected second player for the first identified video game relative to the second identified video game, has indicated predetermined personal characteristics of the selected second player, and has saved the visage, relative interest level, and personal characteristics of the selected second player, and where the step of inviting a second player who has accessed the central computer system from a selected second remote computer system includes the step of accessing the saved visage, relative interest level, and personal characteristics of the selected second player.

39. A computer implemented method of creating a player profile for interacting on a computer gaming network comprising the following:

enabling the first user to identify profile information with respect to a plurality of video games, the profile information including a relative interest level of the first user for a first identified video game relative to a second identified video game, the first and second identified video games being among the plurality of video games; and enabling the first user to make the profile information accessible to a first remote computer system, a central computer system, and at least one other remote computer system, wherein the first computer system, the central computer system, and at least one other remote computer system are elements of a computer gaming network used for multiplayer gaming.

40. The method of claim 39 wherein the profile information is automatically rendered upon the first user inviting a second user to play a game.

41. The method of claim 40 wherein enabling the first user to make the profile information accessible comprises displaying the rendered profile information to the second user upon the first user inviting the second user to play the game.

42. The method of claim 40 further comprising automatically rendering profile information of the second user and displaying the rendered profile information of the second user to the first user upon the first user inviting the second user to play the game, the profile information of the second user including a relative interest level of the second user for the first identified video game relative to the second identified video game.

43. The method of claim 39 wherein the profile information is automatically rendered upon the second user determining that the first user has accessed the central computer system and then the second user taking an action demonstrating an interest in the first user.

44. The method of claim 39 wherein enabling the first user to identify includes enabling the first user to identify a skill level with respect to one or more of the plurality of video games.

45. The method of claim 44 wherein enabling the first user to identify includes enabling the first user to identify a skill level with respect to the first identified video game.

46. The method of claim 39 further comprising enabling the first user to select a visage and enabling the first user to save the visage such that the visage is accessible to a first remote computer system, a central computer system, and at least one other remote computer system.

47. The method of claim 39 further comprising enabling the first user to identify personal characteristics and enabling the first user to save the personal characteristics such that the personal characteristics are accessible to a first remote computer system, a central computer system, and at least one other remote computer system.

48. The method of claim 39 wherein the enabling the first user to identify personal characteristics comprises enabling the first user to identify personal characteristics not related to computer games.

49. The method of claim 39 wherein the relative interest level is chosen from among gradations of interest.

50. The method of claim 49 wherein the gradations of interest include a level representing little interest, a level representing intermediate interest, and a level representing great interest.

51. A computer implemented method of accessing a player profile for interacting on a computer gaming network comprising the following:

enabling the first user to access profile information of a second user with respect to a plurality of video games, the profile information including a relative interest level of the second user for a first identified video game relative to a second identified video game, the first and second identified video games being among the plurality of video games; and enabling the first user to initiate a game with the second user based on the profile information, wherein the first user accesses the profile information using a first remote computer system that communicates with a computer gaming network for multiplayer gaming that includes a central computer system and at least one other remote computer system.

52. The method of claim 51 wherein the profile information is automatically rendered upon the first user inviting a second user to play a game.

53. The method of claim 52 wherein enabling the first user to access profile information of a second user comprises displaying the rendered profile information to the first user upon the first user inviting the second user to play the game.

54. The method of claim 52 further comprising automatically rendering profile information of the first user and displaying the rendered profile information of the first user to the second user upon the first user inviting the second user to play the game, the profile information including a relative interest level of the first user for the first identified video game relative to the second identified video game.

55. The method of claim 51 wherein the profile information is automatically rendered upon the second user determining that the first user has accessed the central computer system and then the second user taking an action demonstrating an interest in the first user.

56. The method of claim 51 wherein enabling the first user to access includes enabling the first user to access a skill level of the second user with respect to one or more of the plurality of video games.

57. The method of claim 56 wherein enabling the first user to access includes enabling the first user to access a skill level of the second user with respect to the first identified video game.

58. The method of claim 51 further comprising enabling the first user to access a visage of the second user.

59. The method of claim 51 further comprising enabling the first user to access personal characteristics of the second user.

60. The method of claim 51 wherein enabling the first user to access personal characteristics comprises enabling the first user to access personal characteristics of the second user not related to computer games.

61. The method of claim 51 wherein the relative interest level is chosen from among gradations of interest.

62. The method of claim 61 wherein the gradations of interest include a level representing little interest, a level representing intermediate interest, and a level representing great interest.

* * * * *